Patented June 23, 1931

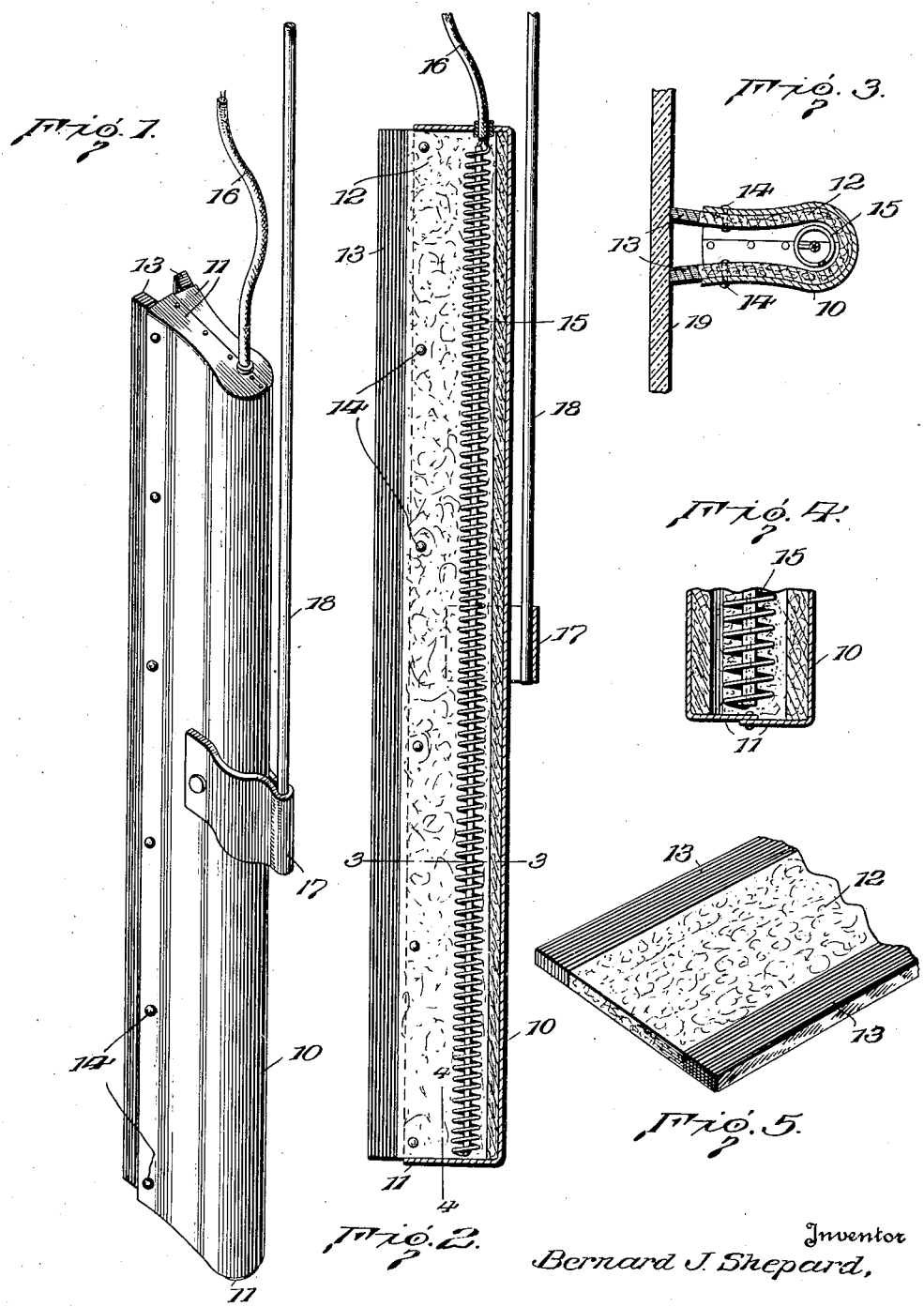

1,811,440

UNITED STATES PATENT OFFICE

BERNARD J. SHEPARD, OF BROOKLYN, NEW YORK

WINDSHIELD WIPER

Application filed January 13, 1930. Serial No. 420,564.

The present invention relates to wind shield wipers, more particularly to an electrically heated wiper, and has for an object to provide a construction of wiper wherein the heat generated by an electrical resistance unit will radiate directly against the wind shield so as to effectively melt snow, ice and the like in freezing weather of practically any degree.

Another object of the present invention is to provide an electrically heated wind shield wiper wherein the wiping elements will not be destroyed by the action of the heat, and wherein the wiping elements are so located as to permit of the direct radiation of the heat to the glass, and the device is so constructed as to prevent dissipation of the heat and to direct it adjacent to but not through the wiper elements.

Heretofore, various attempts have been made to electrically heat wind shield wipers, but such devices utilize the rubber wiper element for transmitting the heat to the wind shield, or so dispose the heating elements against or adjacent to the wiper element as to injure the same as the wiper element under the action of the heat will age, oxidize, resinify and tear; losing its character as a wiper element.

The invention has for another object to provide a simplified construction of wipers for protecting the wiping element and admitting of the direct radiation of the heat against the pane of glass and to also house in and insulate the heating chamber, and to provide a device which may be quickly and easily installed in motor vehicles, airplanes, or in any other position where it is desired to keep clear of snow and ice wind shields or panes which are subject to exposure in inclement weather, and to produce clear visible driving by melting the snow or ice.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a perspective view of a wind shield wiper constructed according to the present invention and as mounted on the outer end of an operating arm.

Figure 2 is a longitudinal central section taken through the same.

Figure 3 is a transverse section taken through the lower portion of the wind shield substantially on the line 3—3 of Figure 2.

Figure 4 is a fragmentary enlarged cross-sectional view taken on the line 4—4 through the lower end of the device as shown in Figure 2, and Figure 5 is an enlarged fragmentary perspective view through a portion of the combined wiper and insulating element used.

Referring now to the drawing, the casing of the wiper is designated at 10 and may comprise a sheet metal body part which is overturned upon itself intermediate its longitudinal edges, the overturned portion being rolled over to provide a cylindrical inner portion to the casing 10 which extends throughout the length thereof, and the opposite end portions are extended in spaced apart relation and are preferably curved or slightly flared outwardly toward their free edge portions. The opposite ends of the casing 10 are preferably closed by the provision of overlapping flanges 11 which may be riveted or otherwise suitably secured together for holding the side walls of the casing 10 in fixed spaced apart relation. These end walls or flanges 11 completely enclose the opposite ends of the casing so that heat generated therein is permitted to escape only through the inner open edge of the casing.

A non-heat conducting lining 12 is fitted against the inner side of the casing 10 and, as shown in Figure 5, may comprise a strip of asbestos or other suitable material corresponding in length to that of the casing 10 and which may be reinforced by wire or the like in the usual manner to give body to the strip of asbestos or other material used.

The lining strip is vulcanized along its opposite longitudinal edge portions with rubber to provide a pair of wiper elements 13 which are adapted to come into contact with the pane of glass or surface of the wind shield, and which are of a length only sufficient to provide the wiper elements. By means of these rubberized edge portions of the non-heat-conducting strip 12 the wire and asbestos fibres are kept away from the surface of the glass or windshield so as to prevent marring of the same incident to the reciprocating movement of the wiper.

The non-heat-conducting strip 12 together with its opposite wiper edge portions 13 is of a combined width sufficient to leave the wiper element portions 13 projecting beyond the open edge of the casing 10 when the lining strip 12 is fitted against the inner wall of the casing 10.

Any suitable means may be provided for securing the lining 12 within the casing 10, and in the present instance a number of rivets 14 are used for this purpose and are secured through the free edge portions of the lining 12 and the corresponding portions of the casing 10. The wiper elements 13 are thus held in spaced apart relation, and the lining 12 is of a thickness which is considerably less than the distance between the sides of the casing 10 so that there is provided a broad relatively flat heat conducting passage between the opposite sides of the casing 10 and the opposite sides of the lining 12, as clearly shown in Figure 3.

A heater element 15 is placed within the rounded part of the casing 10 and lining 12, and may be in the form of a coil of resistance wire or the like, adapted to be heated by the passage of a current of electricity therethrough. The coil 15 may be of any suitable size and length, and in the present instance is disclosed as extending throughout substantially the entire length of the casing 10 and of a diameter sufficient to fill the rounded space in the casing so as to lie closely against and be supported adjacent to the lining 12. The ends of the heating coil or unit 15 merge into a cable 16 which extends through one end of the casing 10, as shown in Figures 1 and 2, or which may be carried exteriorly to the casing in any suitable manner. The cable 16 is adapted to be connected to any suitable source of electric energy, such as to the battery of an automobile or other vehicle.

In operation, the casing 10 is secured by a clamp 17 or the like to an operating arm 18 which may be reciprocated or otherwise moved as desired in order to draw the wiper flatwise back and forth over the surface to be cleaned. The wiper is provided with a pair of spaced apart wiper elements 13 which provide a passage or chamber therebetween which communicates with the interior passage or chamber within the casing 10.

When the circuit is closed, the heater element 15 radiates heat directly through the casing 10 into the passage between the wiper elements 13 and thus directly against the surface of the wind shield or other pane of glass, indicated at 19 in Figure 3. This direct radiation of heat is extremely effective for melting any snow, sleet or ice which accumulates upon the surface of the wind shield 19. At the same time, the wiper elements 13, diverging outwardly from the ends of the insulating strip 12, are not brought into direct contact with the heat and are not used as a medium for the transferring of the heat from the heating element to the surface to be cleaned.

The wiper structure also has the advantage of providing a pair of spaced apart wiper elements 13 which are securely held in the casing 10 as they form the opposite edge portions of the lining, and the latter is secured to the opposite sides of the casing.

It is obvious that various changes and modifications may be made in the details of construction and design of the above specifically described embodiment of this invention without departing from the spirit thereof, such changes and modifications being restricted only by the scope of the following claims.

What is claimed is:—

1. A wind shield wiper, comprising a non-heat-conducting strip faced with a suitable plastic material along its longitudinal edge portions and overturned intermediate its said edge portions to provide spaced wiper elements, a metallic strip overturned against the outer side of said first strip and having end flanges for enclosing said strip with the faced edges protruding from the outturned metallic strip, and a heater element in the fold of the non-conducting strip for radiating heat directly outward between the wiper element edges of the first strip.

2. A wind shield wiper, comprising an elongated flat casing open at one edge only, a non-heat-conducting lining located in said casing and having rubberized opposite edge portions protruding beyond the open edge of the casing and adapted for contact with the surface of a wind shield to be wiped, and a heater element arranged in the fold of the lining and casing and disposed in direct alignment with the space between said wiper elements for radiating heat directly from the heater element to the surface confined between the wiper elements.

In testimony whereof I affix my signature.

BERNARD J. SHEPARD.